United States Patent
Liou et al.

(10) Patent No.: US 11,042,254 B2
(45) Date of Patent: Jun. 22, 2021

(54) TOUCH DISPLAY DEVICES

(71) Applicant: InnoLux Corporation, Miao-Li County (TW)

(72) Inventors: Hao-Yu Liou, Miao-Li County (TW); Hong-Sheng Hsieh, Miao-Li County (TW); Yu-Sheng Chen, Miao-Li County (TW); Jian-Cheng Chen, Miao-Li County (TW); Ying-Shiang Huang, Miao-Li County (TW); Chin-Lung Ting, Miao-Li County (TW); Chung-Kuang Wei, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 449 days.

(21) Appl. No.: 15/795,531

(22) Filed: Oct. 27, 2017

(65) Prior Publication Data

US 2018/0120974 A1  May 3, 2018

Related U.S. Application Data

(60) Provisional application No. 62/416,679, filed on Nov. 2, 2016.

(30) Foreign Application Priority Data

Aug. 2, 2017 (CN) .......................... 201710652056.9

(51) Int. Cl.
*G06F 3/044* (2006.01)

(52) U.S. Cl.
CPC .......... *G06F 3/0446* (2019.05); *G06F 3/0443* (2019.05); *G06F 2203/04111* (2013.01); *G06F 2203/04112* (2013.01)

(58) Field of Classification Search
None
See application file for complete search history.

(56) References Cited

U.S. PATENT DOCUMENTS

| 8,384,671 | B2 * | 2/2013 | Shkolnikov | G06F 1/1626 |
| | | | | 345/169 |
| 9,433,089 | B2 * | 8/2016 | Kim | G06F 3/044 |
| 2011/0134055 | A1 * | 6/2011 | Jung | G06F 3/044 |
| | | | | 345/173 |

(Continued)

*Primary Examiner* — Krishna P Neupane
(74) *Attorney, Agent, or Firm* — McClure, Qualey & Rodack, LLP

(57) ABSTRACT

A touch display device includes a substrate. The substrate includes a display area, a non-display area, a first touch area, and a non-touch area. A first touch grid is disposed within the first touch area. A second touch grid is electrically isolated from the first touch grid and disposed within the first touch area. A first wire is disposed within the non-touch area and electrically connected to the first touch grid. A second wire is disposed within the non-touch area and electrically connected to the second touch grid. The first wire and the second wire are staggered and are electrically isolated from each other. The second wire includes at least two separate conductive units and at least one bridge wire connected to the at least two separate conductive units. An insulating layer is disposed between the first wire and the second wire.

11 Claims, 9 Drawing Sheets

(56) References Cited

U.S. PATENT DOCUMENTS

| | | | | |
|---|---|---|---|---|
| 2012/0111173 A1* | 5/2012 | Bowen | ............... | G10H 1/34 |
| | | | | 84/170 |
| 2014/0168085 A1* | 6/2014 | Huang | ............... | G06F 3/0227 |
| | | | | 345/168 |
| 2017/0031514 A1* | 2/2017 | Kimura | ............... | G06F 3/044 |
| 2017/0123452 A1* | 5/2017 | Evans, V | ............... | G06F 1/1686 |
| 2018/0203549 A1* | 7/2018 | Kim | ............... | G06F 3/041 |

\* cited by examiner

TOUCH DISPLAY DEVICES

CROSS REFERENCE TO RELATED APPLICATIONS

This application claims the benefit of U.S. Provisional Application No. 62/416,679 filed Nov. 2, 2016, and priority of China Patent Application No. 201710652056.9, filed on Aug. 2, 2017, the entirety of which are incorporated by reference herein.

BACKGROUND

Technical Field

The present disclosure relates to touch display devices, and in particular to touch display devices that can reduce the visibility of traces.

Description of the Related Art

Current touch devices have gradually been developing toward large-scale models, and the limits on resistance appear on transparent conductive materials (TCM) (for example, indium zinc oxide (IZO), indium tin oxide (ITO) or the like). This makes the development of large-scale touch devices a great opportunity toward the future development of metal traces. Therefore, the optical design of a metal grid is particularly important. Metal grids without an optical design tend to lead to the problem of the Moiré effect, hampering the continuous improvement of resolution.

Touch panels include a structure with touch functionality disposed on a display panel, and touch structures may be composed of different stack structures (including a conductive layer, an insulating layer, a bridge structure, etc.). In general, the conductive layer in the touch panel is a patterned conductive layer. Therefore, the region where the conductive layer is located may be divided into a region with conductive materials and a region without conductive materials. The arrangement of the conductive materials has been known to cause loss of transmittance of the overall touch panel, leading to problems such as color shift.

In a touch panel with irregular varied appearance, the metal traces may not be used directly for connecting electrodes on the design. Due to the length of each electrode being different, the transmitted and received metal traces may be staggered, which may affect the visibility of traces or cause the signal to not be transmitted successfully to the external touch integrated circuit (IC).

Therefore, it is desirable to develop a touch display device which can effectively reduce the Moiré effect, improve the transmittance, or reduce the visibility of traces.

BRIEF SUMMARY

Some embodiments of the present disclosure provide a touch display device. The touch display device includes: a substrate having a plurality of pixel units. There is a pixel pitch between two adjacent pixel units. These pixel units individually include a plurality of sub-pixels, and each one of the sub-pixels has a sub-pixel area. The touch display device also includes a first touch grid disposed on the substrate and defining a touch area of the substrate.

The first touch grid includes a plurality of first conductive portions, wherein the plurality of first conductive portions have a first boundary and a second boundary opposite to the first boundary; a plurality of second conductive portions, wherein the plurality of second conductive portions have a third boundary and a fourth boundary opposite to the third boundary, wherein the plurality of first conductive portions are substantially parallel to each other, the plurality of second conductive portions are substantially parallel to each other, and the area surrounded by two adjacent first conductive portions of the plurality of first conductive portions and two adjacent second conductive portions of the plurality of second conductive portions is defined as an open region, wherein an extension line of the first boundary adjacent to the open region intersects an extension line of the third boundary adjacent to the open region to form a first intersection, the extension line of the first boundary adjacent to the open region intersects an extension line of the fourth boundary adjacent to the open region to form a second intersection, an extension line of the second boundary adjacent to the open region intersects the extension line of the third boundary adjacent to the open region to form a third intersection, the extension line of the second boundary adjacent to the open region intersects the extension line of the fourth boundary adjacent to the open region to form a fourth intersection, and the distance between the first intersection and the fourth intersection is defined as a first pitch.

The ratio of the first pitch to the pixel pitch satisfies the following relationship:

$$n \times 50\% + 25\% - A\% \leq R1 \leq n \times 50\% + 25\% + A\%$$

In the relationship, R1 is the ratio of the first pitch to the pixel pitch, n is a positive integer less than or equal to 30, and A is 0 or a positive integer less than or equal to 10.

Some embodiments of the present disclosure provide a touch display device. The touch display device includes a substrate having a display area and a non-display area, and a first touch area and a non-touch area, wherein the non-display area is adjacent to the display area, the non-touch area is adjacent to the first touch area, and the first touch area overlaps a portion of the display area, the non-touch area overlaps a portion of the display area. The touch display device also includes a first touch grid disposed within the first touch area, and a second touch grid disposed within the first touch area and electrically isolated from the first touch grid. The touch display device further includes a first wire disposed within the non-touch area and electrically connected to the first touch grid, and a second wire disposed within the non-touch area and electrically connected to the second touch grid. The first wire and the second wire are staggered and electrically isolated from each other, wherein the second wire includes at least two separate conductive units and at least one bridge wire connecting the at least two separate conductive units. In addition, the touch display device includes an insulating layer disposed between the first wire and the second wire.

BRIEF DESCRIPTION OF THE DRAWINGS

The present disclosure can be more fully understood by reading the subsequent detailed description and examples with references made to the accompanying drawings, wherein.

DETAILED DESCRIPTION

The following description is the fabrication and use of the embodiments of the present disclosure. However, it will be apparent that the embodiments of the present disclosure provide many suitable invention concepts and may be embodied in a wide variety of specific backgrounds. The particular embodiments of the disclosure are used merely for the purpose of illustration the fabrication and use the present disclosure by particular methods, and are not intend to limit the range of the present disclosure. In addition, the drawings and description of the embodiments use like numerals to denote like or similar elements.

Figure 1:
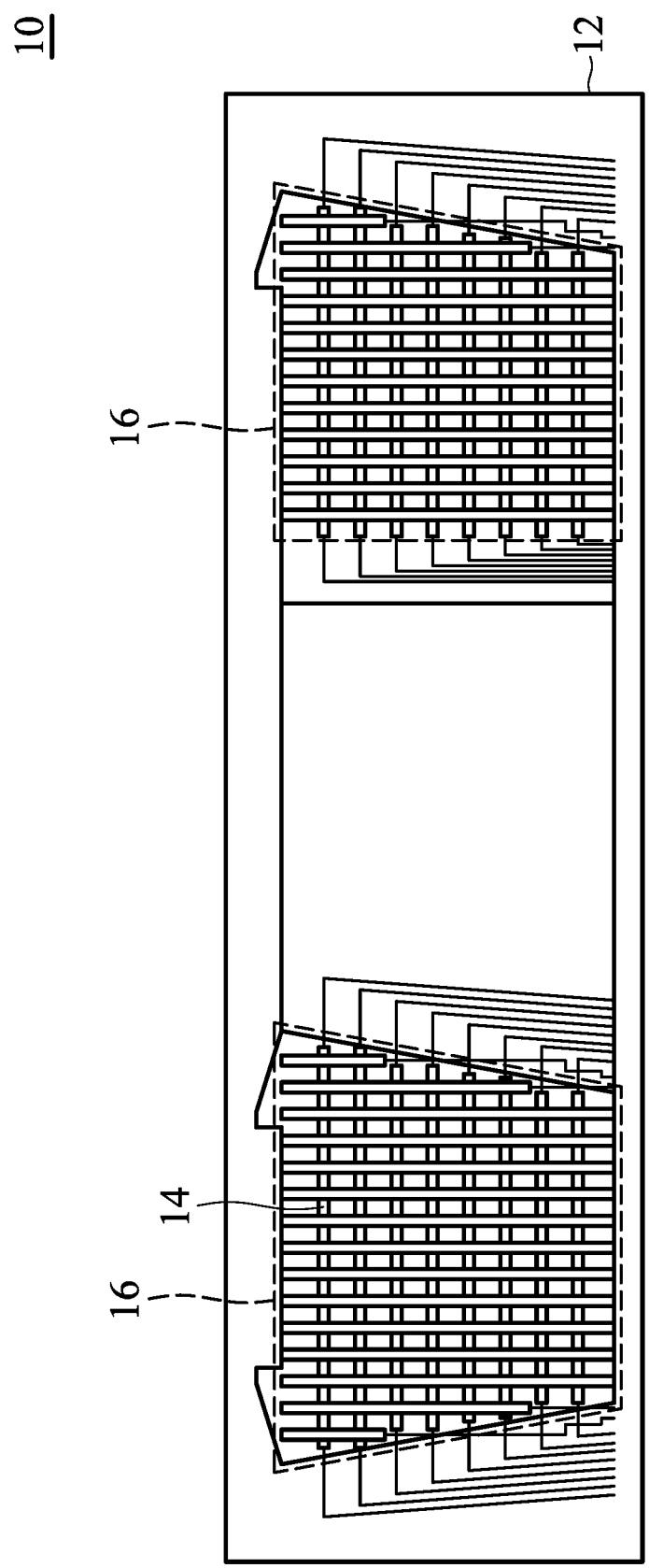
FIG. 1 is a top view of a touch display device according to an embodiment of the present disclosure.

Referring to FIG. 1, according to an embodiment of the present disclosure, a touch display device 10 is provided. FIG. 1 is a top view of the touch display device 10 of embodiment. In the present disclosure, the touch display device 10 includes a display panel. The display panel may be a liquid crystal display (LCD) panel, an organic light-emitting diode display (OLED display) panel, a light-emitting diode display (LED display) panel, a micro light-emitting diode display (μ-LED display) panel, or a quantum dot display (QD display) panel. However, the above described types of display panels are not intended to limit the disclosure. As long as it is a display device with a display function, it can be the display panel of the present disclosure.

As shown in FIG. 1, in the embodiment, the touch display device 10 includes a substrate 12 and a first touch grid 14. The substrate 12 includes a plurality of pixel units (not illustrated). There is a pixel pitch defined by the two adjacent pixel units. Each of the pixel unit includes a plurality of sub-pixels, and one sub-pixel in the plurality of sub-pixels has a sub-pixel area. The first touch grid 14 is disposed on the substrate 12, defining a touch area 16 of the substrate 12. The shape of the first touch grid 14 in FIG. 1 is merely illustrative, which may be designed for different shapes as desired. Further, the substrate 12 may be a substrate of the display panel or any other substrate. Moreover, the substrate 12 may be a flexible substrate or a non-flexible substrate. The material of the flexible substrate may be, for example, polyimide (PI), polyethylene terephthalate (PET), or any other materials which are suitable for flexible substrates. The material of the non-flexible substrate may be, for example, glass, acrylic, or any other materials which are suitable for non-flexible substrates.

In some embodiments, one pixel unit may be composed of a red (R) sub-pixel, a green (G) sub-pixel, and a blue (B) sub-pixel. In the present disclosure, a pixel pitch is defined as the distance from the center of a color sub-pixel within one pixel unit to the center of the same color sub-pixel within an adjacent pixel unit. Therefore, there is a pixel pitch of X direction (X pitch) in the X direction, and a pixel pitch of Y direction (Y pitch) in the Y direction. In addition, the individual areas of the red (R) sub-pixel, the green (G) sub-pixel, and the blue (B) sub-pixel are defined as the sub-pixel area of the pixel unit.

Figure 2:
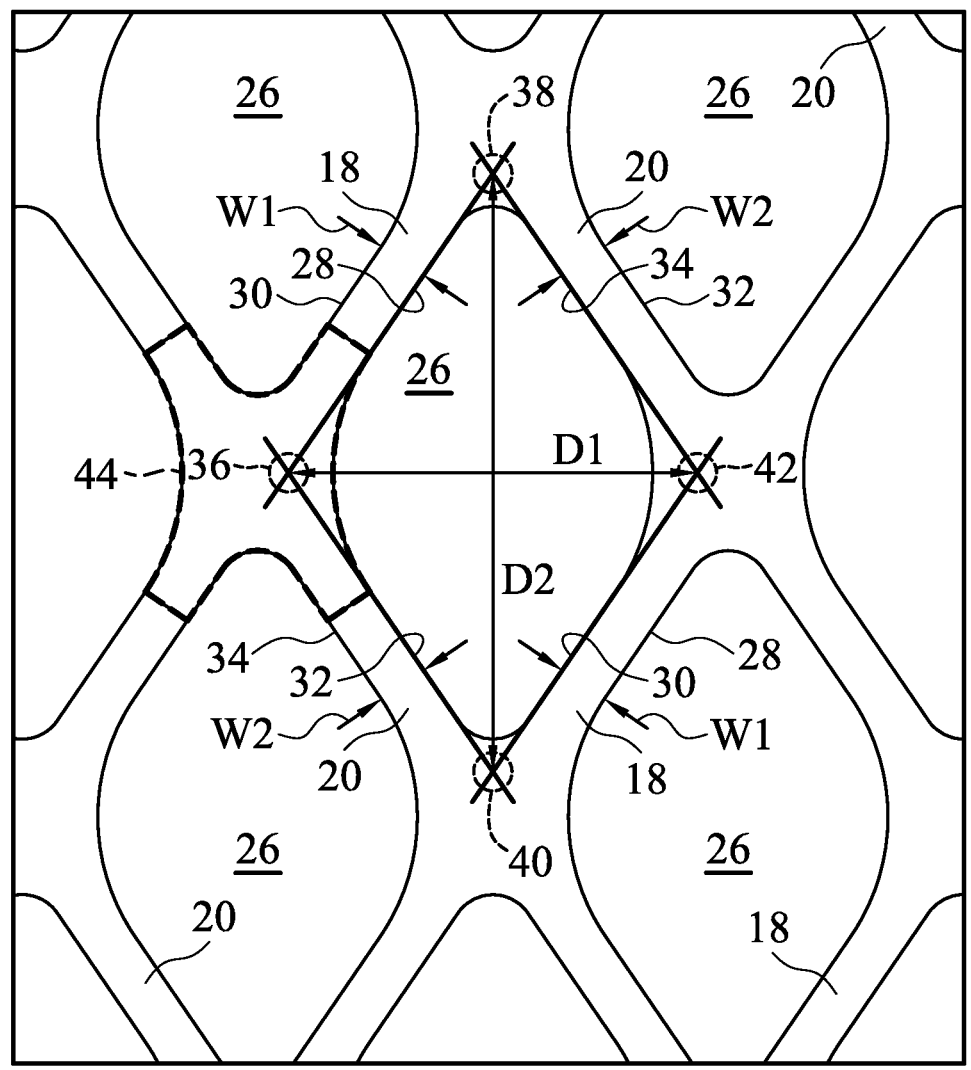
FIG. 2 is a top view of a touch grid of a touch display device according to an embodiment of the present disclosure.

Please refer to FIG. 2, the structure pattern of the first touch grid 14 is described further. FIG. 2 is a partial top view of the first touch grid 14 of the touch display device 10. The first touch grid 14 includes a plurality of first conductive portions 18 in strips and a plurality of second conductive portions 20 in strips. The first conductive portion 18 has a first boundary 28 and a second boundary 30 disposed opposite to each other on two boundaries of a segment with substantially the same width. The second conductive portion 20 has a third boundary 32 and a fourth boundary 34 disposed opposite to each other on two boundaries of a segment with substantially the same width. The plurality of first conductive portions 18 in strips are substantially parallel to each other. The plurality of second conductive portions 20 in strips are substantially parallel to each other. The first conductive portion 18 is not parallel to the second conductive portion 20. The area surrounded by the two adjacent first conductive portions 18 and the two adjacent second conductive portions 20 is defined as an open region 26. Please refer to FIG. 3, the distance between the first boundary 28 and the second boundary 30 of the first conductive portion 18 is substantially equal to a width W1 of the first conductive portion 18 at the above-mentioned segment. The distance between the third boundary 32 and the fourth boundary 34 of the second conductive portion 20 is substantially equal to a width W2 of the second conductive portion 20 at the above-mentioned segment.

Please refer to FIG. 2 again, the extension line of the first boundary 28 adjacent to the open region 26 intersects the extension line of the third boundary 32 adjacent to the open region 26 to form a first intersection 36. The extension line of the first boundary 28 adjacent to the open region 26 intersects the extension line of the fourth boundary 34 adjacent to the open region 26 to form a second intersection 38. The extension line of the second boundary 30 adjacent to the open region 26 intersects the extension line of the third boundary 32 adjacent to the open region 26 to form a third intersection 40. In addition, the extension line of the second boundary 30 adjacent to the open region 26 intersects the extension line of the fourth boundary 34 adjacent to the open region 26 to form a fourth intersection 42.

The distance between the first intersection 36 and the fourth intersection 42 is defined as a first pitch D1. The distance between the second intersection 38 and the third intersection 40 is defined as a second pitch D2.

It is worth noting that, the ratio of the first pitch D1 to the pixel pitch satisfies the following relationship:

$$n \times 50\% + 25\% - A\% \leq R1 \leq n \times 50\% + 25\% + A\%$$

In the above-mentioned relationship, R1 is the ratio of the first pitch D1 to the pixel pitch, n is a positive integer less than or equal to 30, and A is 0 or a positive integer less than or equal to 10.

In the present embodiments, R1 is the ratio of the first pitch D1 to the pixel pitch in X direction (X pitch) of the pixel units.

In some embodiments, R1 is between 65% (n=1, A=10) and 1,535% (n=30, A=10).

The ratio of the second pitch D2 to the pixel pitch satisfies the following relationship:

$$n \times 50\% + 25\% - A\% \leq R2 \leq n \times 50\% + 25\% + A\%$$

In the above-mentioned relationship, R2 is the ratio of the second pitch D2 to the pixel pitch in Y direction (Y pitch) of the pixel units, n is a positive integer less than or equal to 30, and A is 0 or a positive integer less than or equal to 10.

In the present embodiments, R2 is the ratio of the second pitch D2 to the pixel pitch in Y direction (Y pitch) of the pixel units.

In some embodiments, R2 is between 65% (n=1, A=10) and 1,535% (n=30, A=10).

In some embodiments, the first conductive portion 18 intersects the second conductive portion 20 to form an intersection area 44, as shown in FIG. 2.

In the present embodiment, the intersection area 44 formed by the first conductive portion 18 intersecting the second conductive portion 20 is used as an example for illustration.

Figure 3:
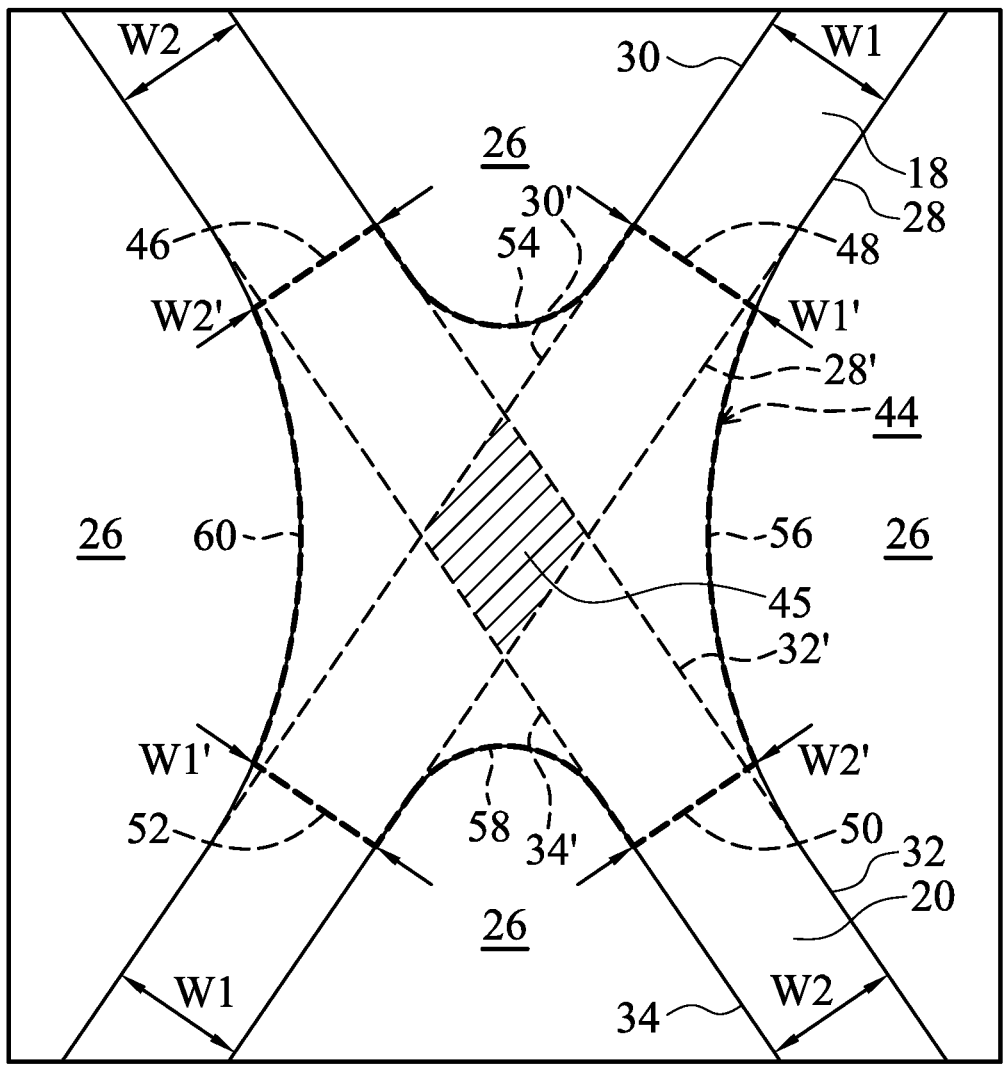
FIG. 3 is a top view of an intersection area of a touch grid according to an embodiment of the present disclosure.

Please refer to FIG. 3, the intersection area 44 is the area surrounded by four end portions 46, 48, 50 and 52 and arcs 54, 56, 58, and 60 connected to the adjacent end portions. FIG. 3 is the top view of the intersection area 44 of the first touch grid 14.

In the present embodiments, widths of the end portions 46, 48, 50 and 52 are defined as widths W1' and widths W2'. The widths of the end portions 48 and 52 are the widths W1'. The end portions 48 and 52 are located at the first conductive portion 18. The width W1' is greater than or equal to the change starting point of the width W1. The width W1' is equal to 1.1 times the width W1. Similarly, the width of the second conductive portion 20 gradually increases in the direction from the end portions 46 and 50 toward the intersection 44. The widths of the end portions 46 and 50 are the widths W2'. The end portions 46 and 50 are located at the second conductive portion 20. The widths W2' are greater than or equal to the change starting point of the widths W2. The widths W2' are equal to 1.1 times the widths W2.

In the present disclosure, the intersection area 44 is the area formed by the end portions of the first conductive portion 18 and the second conductive portion 20 whose widths change by 1.1 times larger than the original widths W1 and W2 thereof. The area of the intersection area 44 is smaller than 4.26% of the sub-pixel area.

In the present embodiment, the extension line 28' of the first boundary 28 of the first conductive portion 18, the extension line 30' of the second boundary 30 of the first conductive portion 18, the extension line 32' of the third boundary 32 of the second conductive portion 20 and the extension line 34' of the fourth boundary 34 of the second conductive portion 20 intersect to form an overlapping region 45.

In some embodiments, the area A1 of the overlapping region 45 is between 0.213% and 0.711% of the sub-pixel area A2.

$$0.213\% \times A2 \leq A1 \leq 0.711\% \times A2$$

In some embodiments, as shown in FIG. 2, in a unit area, the total area of the plurality of open regions 26 accounts for more than 50% and less than 100% of the unit area. For example, in a unit area of 10 mm×10 mm, the total area of the plurality of open regions 26 accounts for more than 50% and less than 100% of the unit area.

Figure 4:
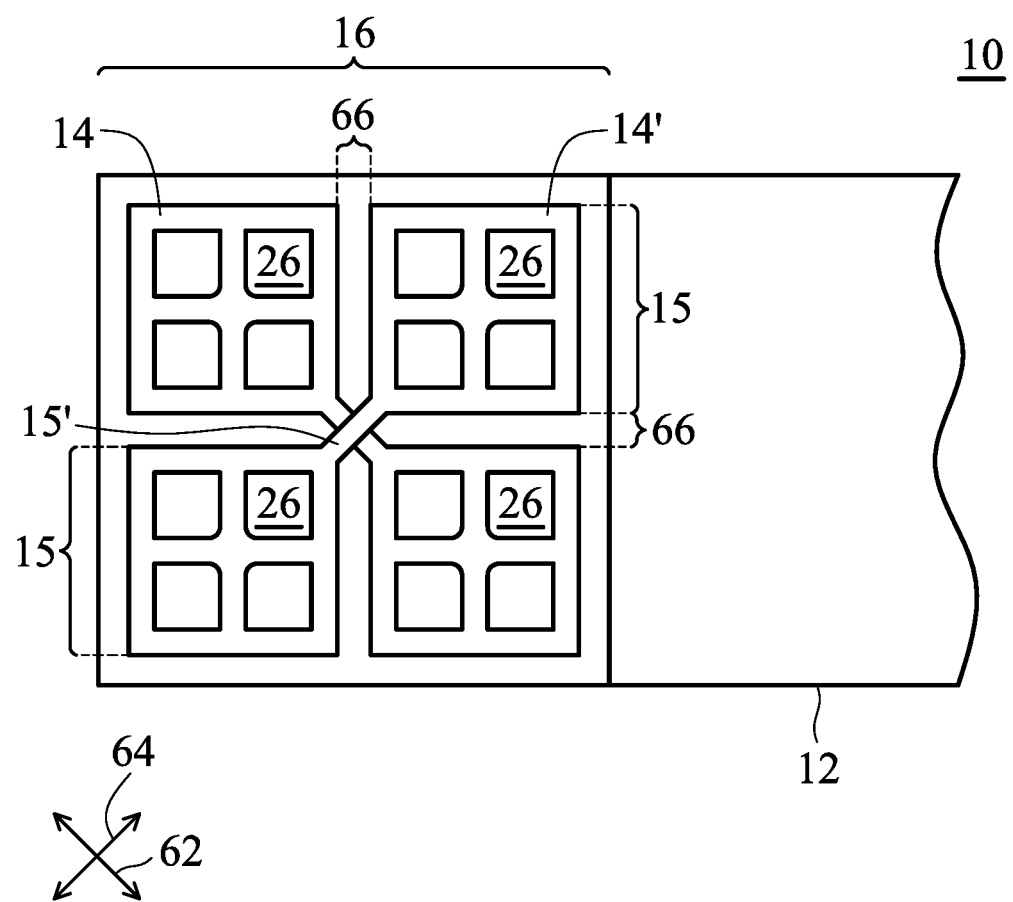
FIG. 4 is a top view of a touch grid of a touch display device according to an embodiment of the present disclosure.

In some embodiments, as shown in FIG. 4, the touch display device 10 of the present disclosure further includes a second touch grid 14' disposed on the substrate 12 and located at the touch area 16 of the substrate 12. FIG. 4 is a top view of the first touch grid 14 and the second touch grid 14' of the touch display device 10. In FIG. 4, the first touch grid 14 extends in a first direction 62, and the second touch grid 14' extends in a second direction 64. The second touch grid 14' includes multiple separate conductive structures 15 and a bridge structure 15'. The bridge structure 15' connects with the separate conductive structures 15. FIG. 4 is merely illustrative and the second touch grid 14' may be presented in other way, as long as it is electrically isolated from the first touch grid 14. The first touch grid 14 and the second touch grid 14' are staggered and electrically isolated from each other. The first touch grid 14 and the second touch grid 14' have a gap 66 between them.

The structure pattern of the second touch grid 14' may refer to FIGS. 2 and 3. As shown in FIG. 2, the second touch grid 14' includes a plurality of first conductive portions 18 in strips and a plurality of second conductive portions 20 in strips. The first conductive portion 18 has a first boundary 28 and a second boundary 30 which are disposed opposite to each other. The second conductive portion 20 has a third boundary 32 and a fourth boundary 34 which are disposed opposite to each other. The definition of the first boundary 28, the second boundary 30, the third boundary 32, and the fourth boundary 34 are described above with reference to the above embodiment, and are not repeated herein. The plurality of first conductive portions 18 in strips are substantially parallel to each other. The plurality of second conductive portions 20 in strips are substantially parallel to each other. The area surrounded by two adjacent first conductive portions 18 and two adjacent second conductive portions 20 is defined as the open region 26.

Please refer to FIG. 2 again, the extension line of the first boundary 28 adjacent to the open region 26 intersects the extension line of the third boundary 32 adjacent to the open region 26 to form a first intersection 36. The extension line of the first boundary 28 adjacent to the open region 26 intersects the extension line of the fourth boundary 34 adjacent to the open region 26 to form the second intersection 38. The extension line of the second boundary 30 adjacent to the open region 26 intersects the extension line of the third boundary 32 adjacent to the open region 26 to form the third intersection 40. In addition, the extension line of the second boundary 30 adjacent to the open region 26 intersects the extension line of the fourth boundary 34 adjacent to the open region 26 to form a fourth intersection 42.

The distance between the first intersection 36 and the fourth intersection 42 is defined as the first pitch D1. The distance between the second intersection 38 and the third intersection 40 is defined as the second pitch D2.

It is worth noting that, the ratio of the first pitch D1 to the pixel pitch satisfies the following relationship:

$$n \times 50\% + 25\% - A\% \leq R1 \leq n \times 50\% + 25\% + A\%$$

In the above-mentioned relationship, R1 is the ratio of the first pitch D1 to the pixel pitch, n is a positive integer less than or equal to 30, and A is 0 or a positive integer less than or equal to 10.

In the present embodiments, R1 is the ratio of the first pitch D1 to the pixel pitch in X direction (X pitch) of the pixel units.

In some embodiments, R1 is between 65% (n=1, A=10) and 1,535% (n=30, A=10).

The ratio of the second pitch D2 to the pixel pitch also satisfies the following relationship:

$$n \times 50\% + 25\% - A\% \leq R2 \leq n \times 50\% + 25\% + A\%$$

In the above-mentioned relationship, R2 is the ratio of the second pitch D2 to the pixel pitch, n is a positive integer less than or equal to 30, and A is 0 or a positive integer less than or equal to 10.

In the present embodiments, R2 is the ratio of the second pitch D2 to the pixel pitch in Y direction (Y pitch) of the pixel units.

In some embodiments, R2 is between 65% (n=1, A=10) and 1,535% (n=30, A=10).

In some embodiments, the first conductive portion 18 intersects the second conductive portion 20 to form an intersection area 44, as shown in FIG. 2.

In the present embodiment, the intersection area 44 formed by the first conductive portion 18 intersecting the second conductive portion 20 is used as an example for illustration.

Please refer to FIG. 3, the intersection area 44 is the area surrounded by four end portions 46, 48, 50 and 52 and arcs 54, 56, 58 and 60 connected to the adjacent end portions.

In the present embodiments, widths of the end portions 46, 48, 50 and 52 are defined as widths W1' and widths W2'. The widths of the end portions 48 and 52 are the widths W1'. The end portions 48 and 52 are located at the first conductive portion 18. The width W1' is greater than or equal to the change starting point of the width W1. The width W1' is equal to 1.1 times the width W1. Similarly, the width of the second conductive portion 20 gradually increases in the direction from the end portions 46 and 50 toward the intersection 44, the widths of the end portions 46 and 50 are the widths W2'. The end portions 46 and 50 are located at the second conductive portion 20. The widths W2' are greater than or equal to the change starting point of the widths W2. The widths W2' are equal to 1.1 times the widths W2.

In the present disclosure, the intersection area 44 is the area formed by the end portions of the first conductive portion 18 and the second conductive portion 20 whose widths change by 1.1 times larger than the original widths W1 and W2 thereof. The area of the intersection area 44 is smaller than 4.26% of the sub-pixel area.

In the present embodiment, the extension line 28' of the first boundary 28 of the first conductive portion 18, the extension line 30' of the second boundary 30 of the first conductive portion 18, the extension line 32' of the third boundary 32 of the second conductive portion 20, and the extension line 34' of the fourth boundary 34 of the second conductive portion 20 intersect to form an overlapping region 45.

In some embodiments, the area A1 of the overlapping region 45 is between 0.213% and 0.711% of the sub-pixel area A2. That is, the area of the overlapping region 45 satisfies the following inequality:

$$0.213\% \times A2 \leq A1 \leq 0.711\% \times A2.$$

In some embodiments, as shown in FIG. 4, in a unit area, the total area of the plurality of open regions 26 and the gap 66 accounts for more than 50% and less than 100% of the unit area. For example, in a unit area of 10 mm×10 mm, the total area of the plurality of open regions 26 and the gap 66 accounts for more than 50% and less than 100% of the unit area.

Figure 5:
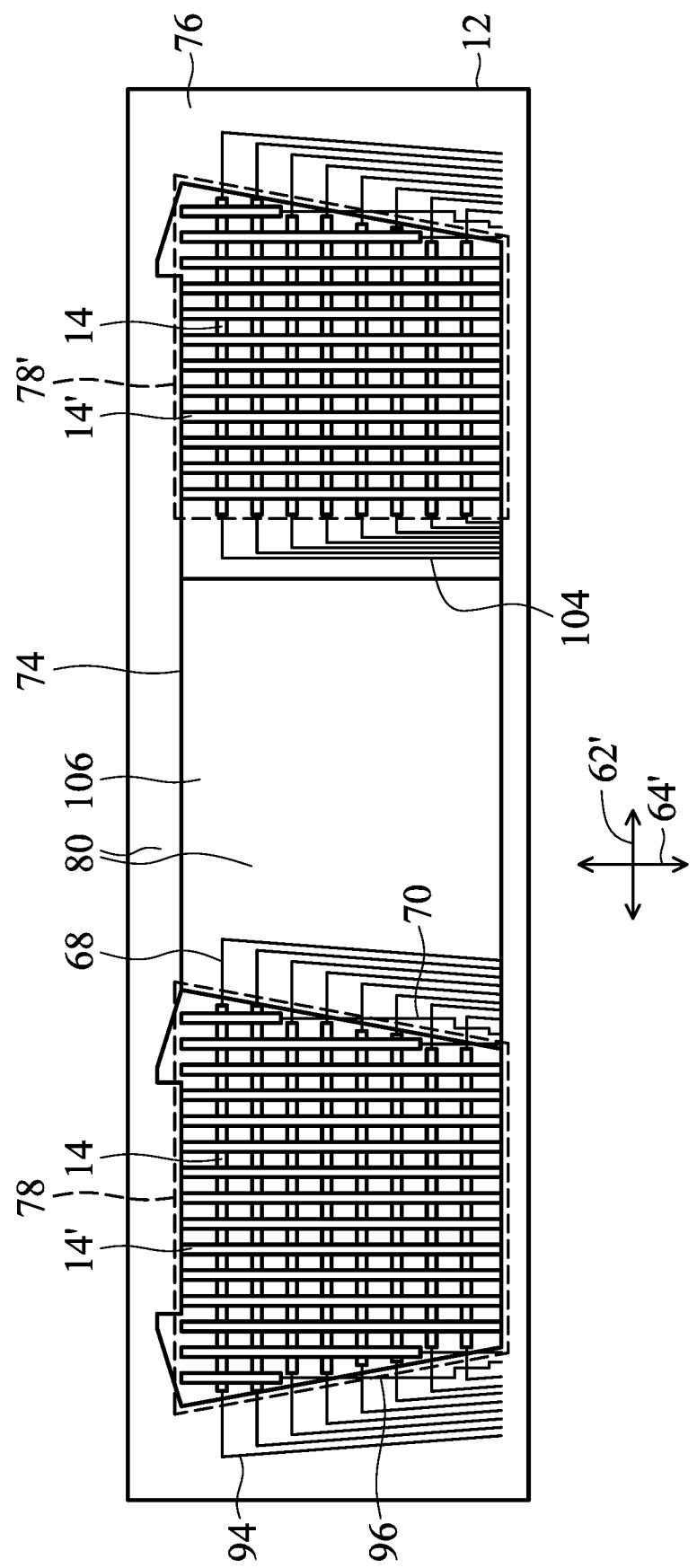
FIG. 5 is a top view of a touch display device according to an embodiment of the present disclosure.

Referring to FIG. 5, according to an embodiment of the present disclosure, a touch display device 10 is provided. FIG. 5 is a top view of the touch display device 10 of the embodiment.

Figure 6:
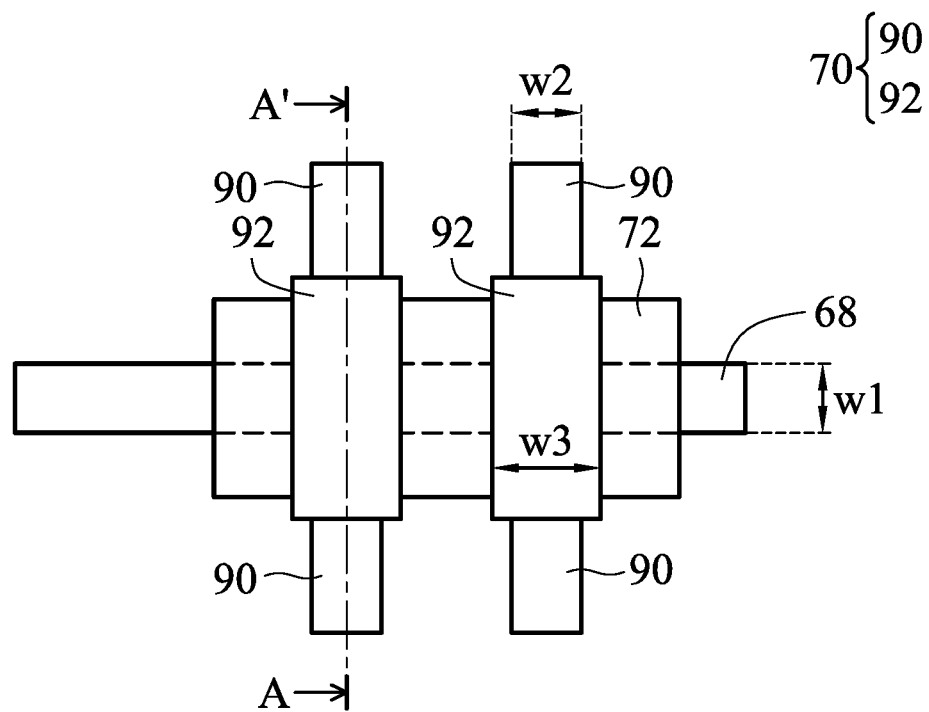
FIG. 6 is a top view of wires within a non-touch area (in a display area) of a touch display device according to an embodiment of the present disclosure.

As shown in FIG. 5, in the embodiments, the touch display device 10 includes a substrate 12, a first touch grid 14, a second touch grid 14', a first wire 68, a second wire 70, and an insulating layer 72 (please see FIG. 6).

The substrate 12 includes a display area 74 and a non-display area 76, and a first touch area 78 and a non-touch area 80. The non-display area 76 is adjacent to the display area 74. The non-touch area 80 is adjacent to the first touch area 78. The first touch area 78 overlaps a portion of the display area 74. The non-touch area 80 overlaps another portion of the display area 74.

The first touch grid 14 is disposed within the first touch area 78. The second touch grid 14' is disposed within the first touch area 78 and electrically isolated from the first touch grid 14. Please refer to FIGS. 2 and 3 for the structure pattern of the first touch grid 14 and the second touch grid 14'. Will not be repeated herein.

Figure 7:
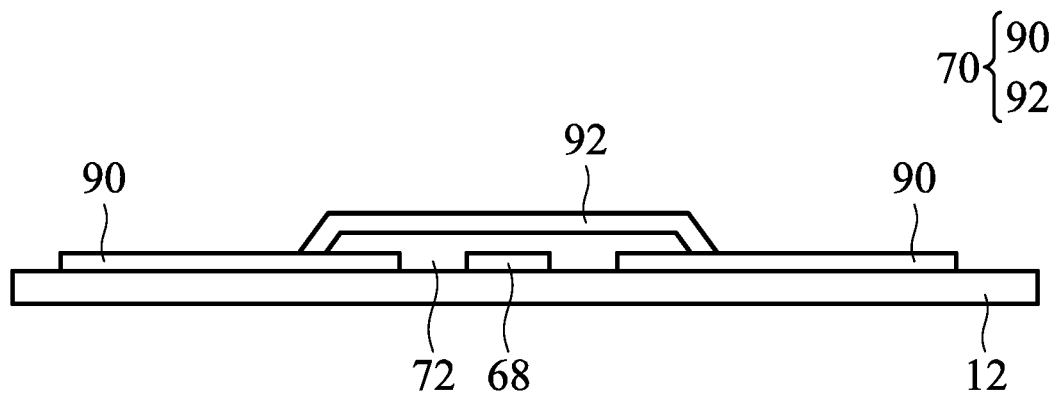
FIG. 7 is a cross-sectional view of wires within a non-touch area (in a display area) of a touch display device along a cross section line A-A' of FIG. 6 according to an embodiment of the present disclosure.

Please refer to FIGS. 5, 6 and 7 together, the layout and the structure pattern of the first wire 68 and the second wire 70 disposed within the non-touch area 80 are described further. FIG. 6 is a top view of the first wire 68 and the second wire 70 at the non-touch area 80 (in the display area) of the touch display device 10. FIG. 7 is a cross-sectional view of the first wire 68 and the second wire 70 at the non-touch area 80 (in the display area) of the touch display device 10 along a cross section line A-A' of FIG. 6. The first wire 68 is disposed within the non-touch area 80, extending in a first direction 62', and electrically connected to the first touch grid 14. The second wire 70 is also disposed within the non-touch area 80, extending in a second direction 64', and electrically connected to the second touch grid 14'. The first wire 68 and the second wire 70 are staggered and electrically isolated from each other.

As shown in FIGS. 6 and 7, the second wire 70 includes at least two separate conductive units 90 and at least one bridge wire 92. The at least one bridge wire 92 is connected to the at least two separate conductive units 90. In addition, an insulating layer 72 is disposed between the first wire 68 and the second wire 70 to avoid signal short circuit between the first wire 68 and the second wire 70. The insulating layer 72 may also be disposed on the entire surface of the substrate 12 as long as an opening is disposed at the location where the at least two separate conductive units 90 are connected to each other, and they are not intended to limit the disclosure.

In some embodiments, the width w1 of the first wire 68 is between 50 μm and 100 μm.

In some embodiments, the width w2 of one of the at least two separate conductive units 90 of the second wire 70 is between 50 μm and 100 μm.

In some embodiments, the width w3 of one of the at least one bridge wire 92 of the second wire 70 is between 30 µm and 150 µm.

In the present embodiments, the at least one bridge wire 92 is disposed on the insulating layer 72, as shown in FIGS. 6 and 7, to form a wire structure pattern of, for example, a top bridge.

In the present embodiments, the at least two separate conductive units 90 and the at least one bridge wire 92 of the second wire 70 and the first wire 68 may be made of a transparent conductive material, for example, indium tin oxide (ITO), but it is not limited thereto.

Figure 8:
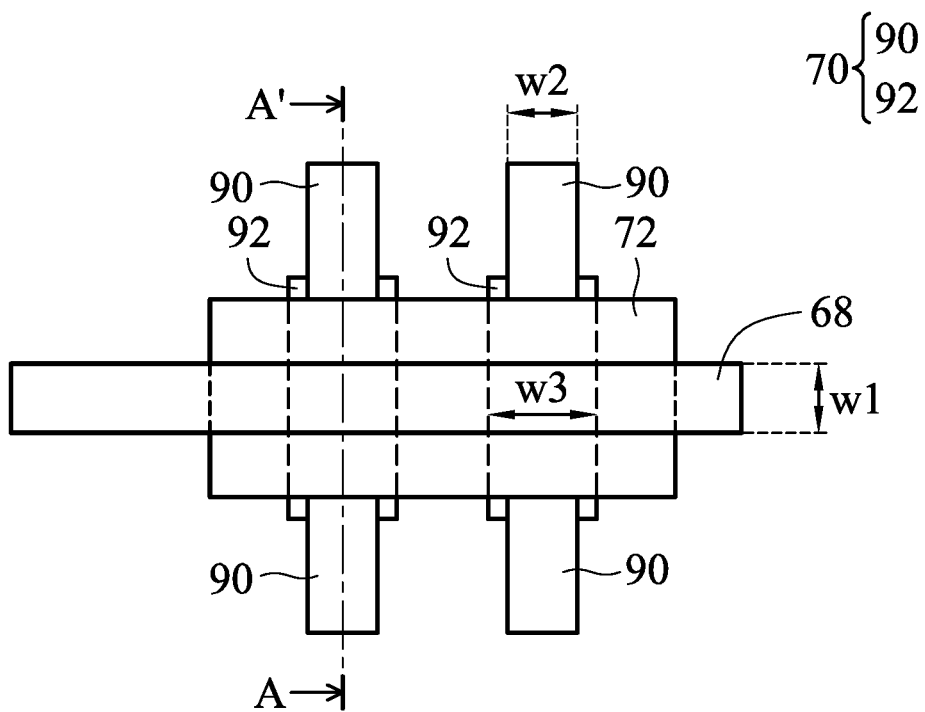
FIG. 8 is a top view of wires within a non-touch area (in a display area) of a touch display device according to an embodiment of the present disclosure.
Figure 9:
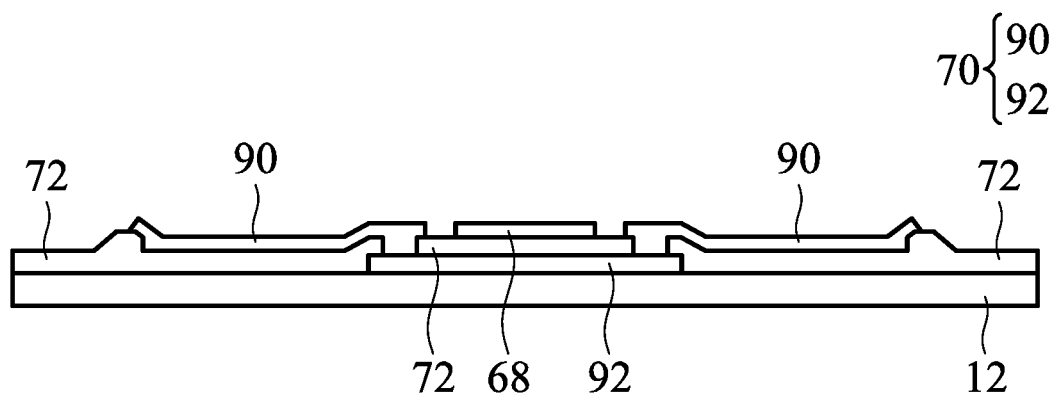
FIG. 9 is a cross-sectional view of wires within a non-touch area (in a display area) of a touch display device along a cross section line A-A' of FIG. 8 according to an embodiment of the present disclosure.

Please refer to FIGS. 8 and 9, another structural pattern of the first wire 68 and the second wire 70 disposed within the non-touch area 80 is illustrated. FIG. 8 is a top view of the first wire 68 and the second wire 70 at the non-touch area 80 (in the display area) of the touch display device 10. FIG. 9 is a cross-sectional view of the first wire 68 and the second wire 70 at the non-touch area 80 (in the display area) of a touch display device 10 along a cross section line A-A' of FIG. 8. As shown in FIGS. 8 and 9, the second wire 70 includes at least two separate conductive units 90 and at least one bridge wire 92. The at least one bridge wire 92 is connected to the at least two separate conductive units 90. In addition, an insulating layer 72 is disposed between the first wire 68 and the second wire 70 to avoid signal short circuit between the first wire 68 and the second wire 70.

In some embodiments, the width w1 of the first wire 68 is between 50 µm and 100 µm.

In some embodiments, the width w2 of one of the at least two separate conductive units 90 of the second wire 70 is between 50 µm and 100 µm.

In some embodiments, the width w3 of one of the at least one bridge wire 92 of the second wire 70 is between 30 µm and 150 µm.

In the present embodiments, the at least one bridge wire 92 is disposed between the insulating layer 72 and the substrate 12, as shown in FIGS. 8 and 9, to form a wire structure pattern of, for example, a bottom bridge.

In the present embodiments, the at least two separate conductive units 90 and the at least one bridge wire 92 of the second wire 70 and the first wire 68 may be made of a transparent conductive material, for example, indium tin oxide (ITO).

In some embodiments, the touch display device 10 of the present disclosure further includes a third wire 94 and a fourth wire 96 disposed within the non-display area 76.

Figure 10:
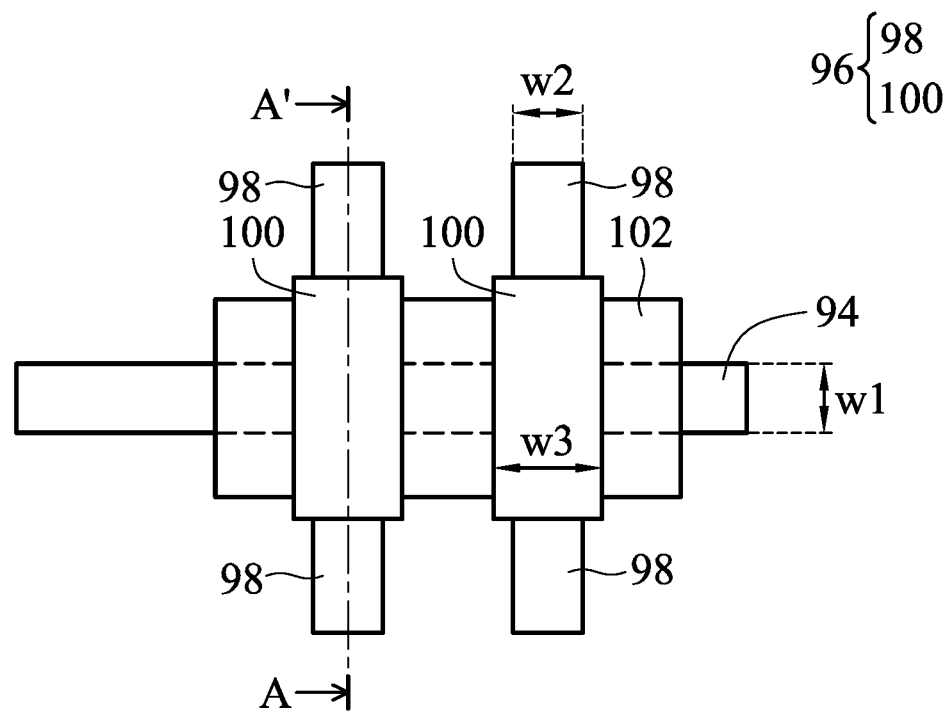
FIG. 10 is a top view of wires within a non-display area of a touch display device according to an embodiment of the present disclosure.
Figure 11:
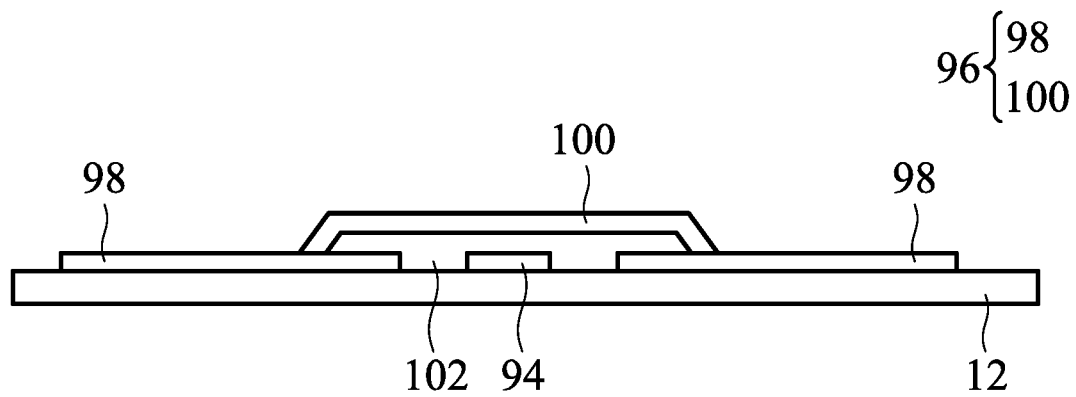
FIG. 11 is a cross-sectional view of wires within a non-display area of a touch display device along a cross section line A-A' of FIG. 10 according to an embodiment of the present disclosure.

Please refer to FIGS. 5, 10, and 11 together, the layout and the structure pattern of the third wire 94 and the fourth wire 96 disposed within the non-display area 76 is described further. FIG. 10 is a top view of the third wire 94 and the fourth wire 96 at the non-display area 76 of the touch display device 10. FIG. 11 is a cross-sectional view of the third wire 94 and the fourth wire 96 at the non-display area 76 of the touch display device 10 along a cross section line A-A' of FIG. 10. The third wire 94 is disposed within the non-display area 76 and electrically connected to the first touch grid 14. The fourth wire 96 is also disposed within the non-display area 76 and electrically connected to the second touch grid 14'. The third wire 94 and the fourth wire 96 are staggered and electrically isolated from each other.

As shown in FIGS. 10 and 11, the fourth wire 96 includes at least two separate conductive units 98 and at least one bridge wire 100. The at least one bridge wire 100 is connected to the at least two separate conductive units 98. In addition, an insulating layer 102 is disposed between the third wire 94 and the fourth wire 96 to avoid signal short circuit between the third wire 94 and the fourth wire 96.

In some embodiments, the width w1 of the third wire 94 is between 50 µm and 100 µm.

In some embodiments, the width w2 of one of the at least two separate conductive units 98 of the fourth wire 96 is between 50 µm and 100 µm.

In some embodiments, the width w3 of the at least one bridge wire 100 of the fourth wire 96 is between 30 µm and 150 µm.

In the present embodiments, the at least one bridge wire 100 is disposed on the insulating layer 102, as shown in FIGS. 10 and 11, to form a wire structure pattern of, for example, a top bridge.

In the present embodiments, the at least two separate conductive units 98 of the fourth wire 96 and the third wire 94 may be formed of metal material such as copper, aluminum, gold, silver or an alloy thereof, but the present disclosure is not limited, as long as the materials are electrically conductive.

In the present embodiments, the at least one bridge wire 100 of the fourth wire 96 may be formed of transparent conductive material, for example, indium tin oxide (ITO) or the like, or may be formed of other conductive materials. The present disclosure is not particularly limited.

Figure 12:
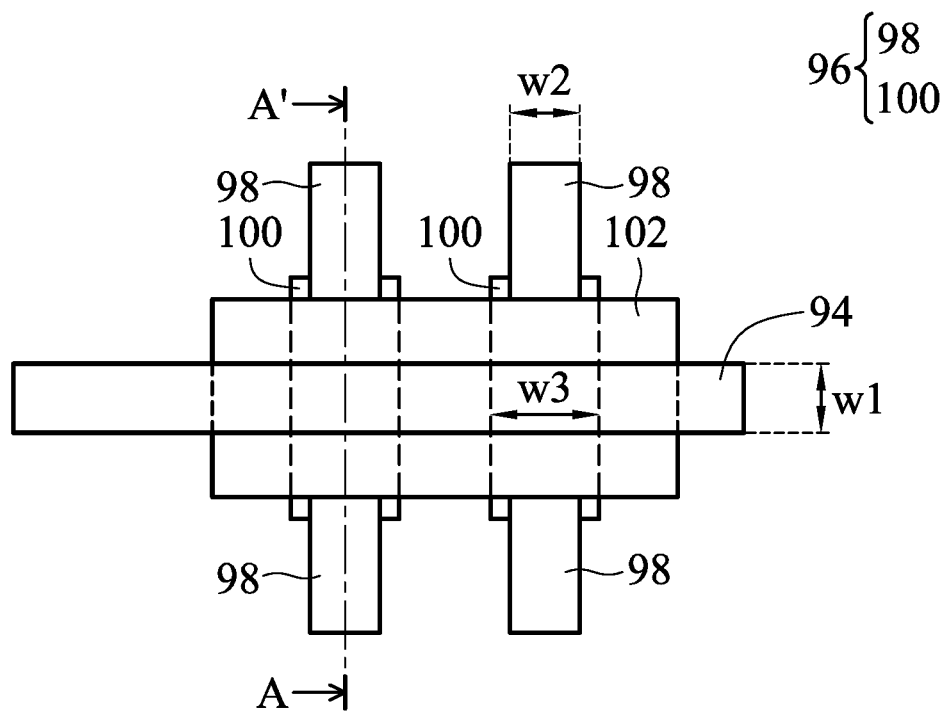
FIG. 12 is a top view of wires within a non-display area of a touch display device according to an embodiment of the present disclosure.
Figure 13:
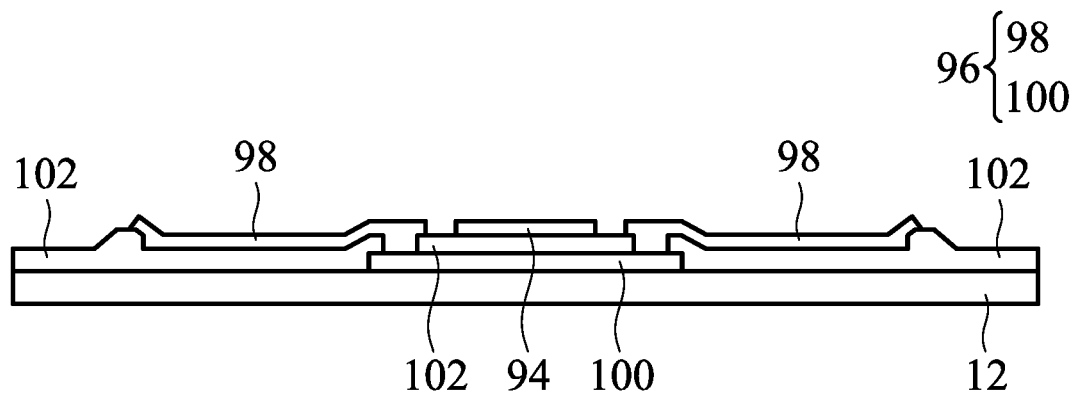
FIG. 13 is a cross-sectional view of wires within a non-display area of a touch display device along a cross section line A-A' of FIG. 12 according to an embodiment of the present disclosure.

Please refer to FIGS. 12 and 13, another structural pattern of the third wire 94 and the fourth wire 96 disposed within the non-display area 76 is illustrated. FIG. 12 is a top view of the third wire 94 and the fourth wire 96 at the non-display area 76 of the touch display device 10. FIG. 13 is a cross-sectional view of the third wire 94 and the fourth wire 96 at the non-display area 76 of the touch display device 10 along a cross section line A-A' of FIG. 12. As shown in FIGS. 12 and 13, the fourth wire 96 includes at least two separate conductive units 98 and at least one bridge wire 100. The at least one bridge wire 100 is connected to the at least two separate conductive units 98. In addition, an insulating layer 102 is disposed between the third wire 94 and the fourth wire 96 to avoid signal short circuit between the third wire 94 and the fourth wire 96.

In some embodiments, the width w1 of the third wire 94 is between 50 µm and 100 µm.

In some embodiments, the width w2 of one of the at least two separate conductive units 98 of the fourth wire 96 is between 50 µm and 100 µm.

In some embodiments, the width w3 of the at least one bridge wire 100 of the fourth wire 96 is between 30 µm and 150 µm.

In the present embodiments, the at least one bridge wire 100 is disposed between the insulating layer 102 and the substrate 12, as shown in FIGS. 12 and 13, to form a wire structure pattern of, for example, a bottom bridge.

In the present embodiments, the at least two separate conductive units 98 of the fourth wire 96 and the third wire 94 may be formed of metal material, for example, copper, aluminum, gold, silver or an alloy thereof, but the present disclosure is not limited, as long as the materials are electrically conductive.

In the present embodiments, the at least one bridge wire 100 of the fourth wire 96 may be formed of transparent conductive material, for example, indium tin oxide (ITO) or the like, or may be formed of other conductive materials. The present disclosure is not particularly limited.

Please refer to FIG. 5, in some embodiments, the substrate 12 of the touch display device 10 of the present disclosure further includes a second touch area 78', which overlaps a portion of the display area 74. The second touch area 78' is separated from the first touch area 78 by the non-touch area 80.

In some embodiments, a first touch grid 14 and a second touch grid 14' are disposed within the second touch area 78'. Please refer to FIGS. 2 and 3 for the structure pattern of the first touch grid 14 and the second touch grid 14'. Will not be repeated herein.

In some embodiments, the touch display device 10 of the present disclosure further includes a fifth wire 104 disposed within the non-touch area 80 and electrically connected to the first touch grid 14 or the second touch grid 14' of the second touch area 78'.

In some embodiments, the fifth wire 104 may be formed of transparent conductive material, for example, indium tin oxide (ITO) or the like.

In some embodiments, the touch display device 10 of the present disclosure further includes an optical adjustment layer 106 disposed within the non-touch area 80. The pattern of the optical adjustment layer 106 may be the same as or different from that of the first touch grid 14 or the second touch grid 14', and the present disclosure is not particularly limited.

In some embodiments, the optical adjustment layer 106 may be formed of transparent conductive material, for example, indium tin oxide (ITO) or the like.

In some embodiments, the optical adjustment layer 106 may be set as floating state.

In some embodiments, the optical adjustment layer 106 may be set as connecting to ground.

In some embodiments, the optical adjustment layer 106 may be set as connecting to a constant electric potential.

The present disclosure provides a rule of optical design of metal grid, so that, when a metal grid designed based on this rule is applied in large-scale or high pixels per inch (PPI) models, they may obtain better Moiré performance. For example, when the ratio of the distance of open regions of metal grids in the X direction and in the Y direction to the pixel pitch individually satisfies n×50%+25%±A % (wherein n is a positive integer less than or equal to 30, A is 0 or a positive integer less than or equal to 10), the Moiré effect can be controlled to remain within in a desired range. In addition, better Moiré performance may be obtained when the area of the overlapping regions in the metal grid is between 0.213% and 0.711% of the sub-pixel area. Meanwhile, when the area of the intersection area in the metal grid is set as smaller than 4.26% of the sub-pixel area, better Moiré performance may be obtained as well.

The present disclosure imposes a grid pattern on a transparent conductive film of touch area to reduce the amount of area occupied by the transparent conductive film, i.e., increase the ratio of the area not occupied by the transparent conductive film in a specific region (for example, in a unit area, the total area of the open regions and gaps accounts for more than 50% of the unit area), in order to effectively reduce the loss of transmittance due to disposition of the transparent conductive film and reduce problems of color shifting.

The present disclosure uses a metal trace layout with ITO as a bridge so that the boundary of the touch panel (the non-display area) has an appearance with an irregular variation. The touch display devices can prevent the signal from short-circuiting and keep the driving and sensing signal lines orthogonal to reduce the coupling capacitor. The above effects can be achieved without additional masks. In addition, in the large-scale display devices used in vehicles, in a non-touch area adjacent to a touch area, replacing the metal traces with the ITO traces not only reduces the visibility of traces but also reduces the drive load of the touch display devices.

While the disclosure has been disclosed by several preferred embodiments, the disclosure is not limited to the disclosed embodiments. Those skilled in the art may make various substitutions and alterations herein without departing from the spirit and scope of the present disclosure, and the different embodiments may be mixed to use, which is not limited herein. Therefore, the scope of protection of the present disclosure is defined as the subject matter set forth in the appended claims.

What is claimed is:

1. A touch display device, comprising:
 a substrate, including a display area and a non-display area, and a first touch area, a second touch area and a touch non-sensing area, wherein the non-display area is adjacent to the display area, the touch non-sensing area is adjacent to the first touch area, the first touch area overlaps a first portion of the display area, the second touch area overlaps a second portion of the display area and is separated from the first touch area by the touch non-sensing area, and the touch non-sensing area overlaps a third portion of the display area;
 a first touch grid disposed within the first touch area and extending in a first direction, wherein the first touch area, the touch non-sensing area and the second touch area are adjacent to each other in the first direction, and the touch non-sensing area is disposed between the first touch area and the second touch area;
 a second touch grid disposed within the first touch area and electrically isolated from the first touch grid;
 a first wire disposed within the touch non-sensing area and electrically connected to the first touch grid;
 a second wire disposed within the touch non-sensing area and electrically connected to the second touch grid, wherein the first wire and the second wire are staggered and electrically isolated from each other, wherein
 the second wire comprises at least two separate conductive units and at least one bridge wire, and the at least one bridge wire is connected to the at least two separate conductive units; and
 an insulating layer disposed between the first wire and the second wire.

2. The touch display device as claimed in claim 1, wherein a width of the first wire is between 50 µm and 100 µm.

3. The touch display device as claimed in claim 1, wherein a width of one of the at least two separate conductive units is between 50 µm and 100 µm.

4. The touch display device as claimed in claim 1, wherein a width of one of the at least one bridge wire is between 30 µm and 150 µm.

5. The touch display device as claimed in claim 1, further comprising:
 a third wire disposed within the non-display area and electrically connected to the first touch grid; and
 a fourth wire disposed within the non-display area and electrically connected to the second touch grid, wherein the third wire and the fourth wire are staggered and electrically isolated from each other, wherein
 the fourth wire comprises at least two separate conductive units and at least one bridge wire, and the at least one bridge wire is connected to the at least two separate conductive units; and
 an insulating layer disposed between the third wire and the fourth wire.

6. The touch display device as claimed in claim 5, wherein a width of the third wire is between 50 μm and 100 μm.

7. The touch display device as claimed in claim 5, wherein a width of one of the at least two separate conductive units is between 50 μm and 100 μm.

8. The touch display device as claimed in claim 5, wherein a width of one of the at least one bridge wire is between 30 μm and 150 μm.

9. The touch display device as claimed in claim 1, further comprising:
   a third touch grid disposed within the second touch area; and
   a fourth touch grid disposed within the second touch area, and the fourth touch grid is electrically isolated from the third touch grid.

10. The touch display device as claimed in claim 9, further comprising a fifth wire disposed within the touch non-sensing area and electrically connected to the third touch grid or the fourth touch grid of the second touch area.

11. The touch display device as claimed in claim 1, further comprising an optical adjustment layer disposed within the touch non-sensing area.

\* \* \* \* \*